United States Patent [19]
Karpal

[11] 3,752,173
[45] Aug. 14, 1973

[54] NONSPILL BATTERY VENT PLUG

[75] Inventor: David L. Karpal, Pomona, Calif.

[73] Assignee: Teledyne, Inc., Los Angeles, Calif.

[22] Filed: Dec. 10, 1971

[21] Appl. No.: 206,729

[52] U.S. Cl. .................................. 137/43, 136/178
[51] Int. Cl. .......................................... G05d 16/00
[58] Field of Search .................. 136/178; 220/44 R; 251/77; 137/43, 38, 39

[56] References Cited
UNITED STATES PATENTS

| | | | |
|---|---|---|---|
| 2,306,974 | 12/1942 | Oestermeyer et al. | 137/43 |
| 2,981,272 | 4/1961 | Jammal | 137/43 |
| 2,717,610 | 9/1955 | Gill | 137/43 |
| 2,571,893 | 10/1951 | Kendall | 136/178 |

Primary Examiner—Robert G. Nilson
Assistant Examiner—Edward Look
Attorney—Ronald W. Reagin et al.

[57] ABSTRACT

A nonspill battery vent plug is disclosed which includes a tiltable member which lifts a valve stem to close the plug whenever it is tilted. Improved means of connecting the valve stem and the weight member is provided to prevent fouling and malfunction.

9 Claims, 1 Drawing Figure

Patented Aug. 14, 1973  3,752,173
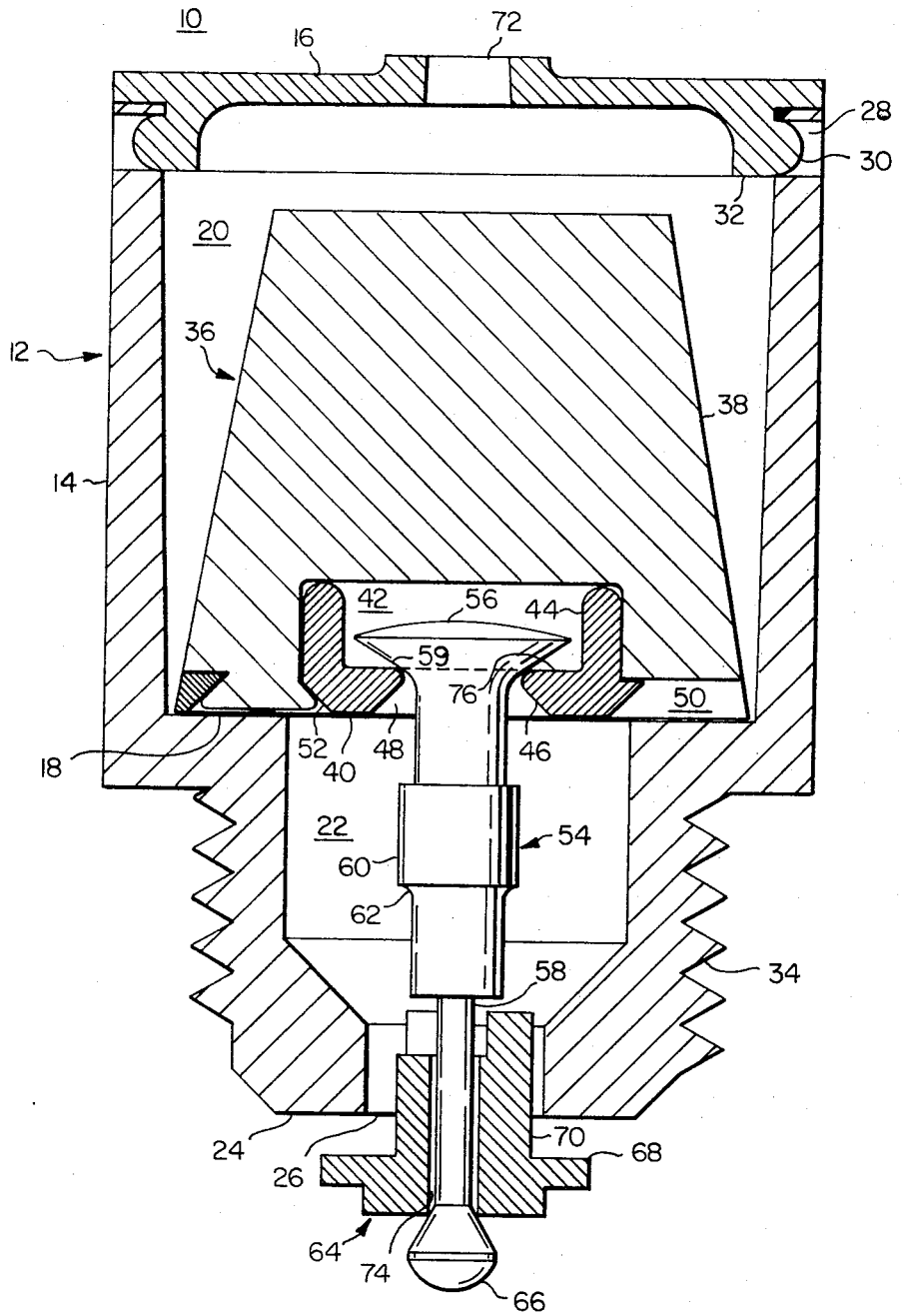
DAVID L. KARPAL
INVENTOR
BY Ronald W. Reagin
ATTORNEY

NONSPILL BATTERY VENT PLUG

This invention relates to nonspill battery vent plugs and more particularly to such a vent plug which is less subject to fouling during use.

Storage batteries, such as the familiar lead-acid storage battery, are sometimes used in applications in which the battery is occasionally supported in a position other than the normal or vertical position. For example, when such storage batteries are used in aircraft, the battery frequently finds itself in a position other than absolutely vertical, and is sometimes actually upside-down when the airplane is flying in an inverted flight. It is a common practice to provide such storage batteries with some form of nonspill vent plug so that the acid or other electrolyte in the battery does not leak out through the necessary vent holes when the battery is positioned in a position other than vertical.

One form of nonspill vent plug known in the art includes a housing assembly having a tubular body member which includes an inwardly projecting shoulder which divides the housing assembly into an upper interior portion and a lower interior portion. The housing assembly also includes upper and lower axial openings through which gas evolved in the battery can escape when the battery is positioned vertically. A tipping weight member rests on the above mentioned shoulder and a valve stem is secured to the bottom of the weight which projects downwardly through the lower interior portion of the housing assembly and usually also through the lower axial opening in the housing assembly. Whenever the axis of such a plug is tilted a suitable angular distance away from vertical, the weight member tilts relative to the housing assembly, and in so doing raises the valve stem upward relative to the housing assembly. Suitable means are provided in response to this upward movement of the valve stem to seal or close the opening in the bottom surface of the housing assembly, thereby preventing electrolyte in the battery from leaking out this hole when the battery is so tilted.

One of the problem areas encountered in the prior art with such nonspill battery plugs has been the manner of connecting the valve stem to the weight. Obviously, the connection between the weight and the valve stem cannot be a rigid connection, since the weight is tilting laterally while the valve stem is moving upwardly. Thus, some form of "universal" joint must be provided between these elements.

One common form of connection known in the prior art is to provide, in effect, a ball-and-socket joint by providing a spherical or quasi-spherical cap at the top of the valve stem and providing a cavity in the bottom of the weight which has a mating spherical or quasi-spherical surface. This type of connection allows relative angular movement between the axis of the weight and the valve stem while still causing the weight to lift the valve stem upward when the weight is tilted.

However, it has been found that structures of this type have a limited operating lifetime. In operation, solid particles, such as particles of lead and lead oxide, are also carried out of the battery cell by the gases escaping through the vent plug, and over a period of time these particles tend to build up between the spherical surface at the top of the valve stem and the mating spherical surface in the weight. As this occurs, the valve stem is gradually held higher and higher by the weight, even when the plug is in the vertical position, and eventually the valve becomes closed even when the plug is in a vertical position. When this occurs, the evolving gas in the battery cell continues to build up until either the valve is blasted open or even until the battery itself explodes. Obviously, this is a quite undesirable result.

It is accordingly an object of the present invention to provide an improved nonspill battery vent plug.

It is yet another object of the present invention to provide an improved nonspill battery vent plug in which solid particles do not build up between the valve stem and the weight assembly.

It is yet another object of the present invention to provide an improved joint between the valve stem and the weight assembly in a nonspill battery vent plug.

It is yet another object of the present invention to provide an improved nonspill battery vent plug in which, if excess pressures are built up in the battery, the excess pressures are safely vented to the atmosphere without destruction of either the battery or the vent plug.

Briefly stated, and in accordance with the presently preferred embodiment of this invention, a nonspill battery vent plug is provided which includes a housing assembly having a tubular body member including an inwardly projecting shoulder member which defines an upper interior portion and a lower interior portion of the housing assembly and having a bottom surface which includes a first axial opening therein. A weight member is provided which is positioned in the upper interior portion of the housing assembly and which rests freely on the shoulder member. The weight member is adapted to tilt relative to the housing assembly whenever the axis of the plug assembly is tilted beyond a predetermined angle from vertical. The weight member includes a cavity in its bottom surface and an inwardly projecting lip member separating this cavity from the lower interior portion of the housing assembly, the lip member thus defining a second axial opening between the cavity and the lower interior portion of the housing assembly. A valve stem member is provided which has a head portion and a stem portion. The head portion is positioned in the cavity, and has an outer diameter greater than the diameter of the second axial opening. The lower support surface of the head portion is substantially a frusto-conical surface. The stem portion of the valve stem member extends actually through the second axial opening into the lower interior portion of the housing assembly and through the first axial opening in the bottom surface of the housing assembly. The stem member is lifted upward relative to the housing assembly by the weight member whenever the weight member tilts relative to the housing assembly. Sealing means are provided responsive to upward movement of the valve stem member relative to the housing assembly to seal the first axial opening whenever the weight member tilts relative to the housing assembly.

For a complete understanding of the invention, and an appreciation of its other objects and advantages, please refer to the following detailed description of the attached drawing, in which the sole FIGURE shows a cross-sectional view of a nonspill battery vent plug assembly in accordance with the present invention.

FIG. 1 shows a cross-sectional view of a nonspill battery vent plug 10 in accordance with the present invention. The plug 10 includes a housing assembly 12 consisting of a body member 14 and a cap member 16. Body member 14 includes an inwardly projecting shoulder member 18 which divides the interior of body member 14 into an upper interior portion 20 and a lower interior portion 22. Body member 14 also includes a bottom surface 24 which has therein a first axial opening 26 extending into lower interior portion 22 of the body member 14. The function of this first axial opening 26 is described below.

Cap member 16 is secured across the open top end of body member 14 in a manner that it may easily be snapped off, for reasons that are described in detail below. For example, a plurality of circular holes 28 may be provided around the top portion of body member 14. A corresponding plurality of hemispherical protuberances 30 is provided on the outer surface of a downwardly extending flange section 32 of cap member 16. When cap member 16 is positioned as shown in the FIGURE, each of the hemispherical protuberances 30 is positioned in its respective hole 28 to hold cap member 16 flangibly to body member 14. Any desired number of such openings and hemispherical protuberances can be used, depending upon the degree of frangibility desired. In practice, it has been found satisfactory to make the plug 10 having two such holes and hemispherical protuberances diametrically opposed to each other, as shown in the FIGURE.

Suitable helical threads 34 are provided around the outer surface of the lower portion of housing member 14 to enable the plug 10 to be screwed into the usual cap openings and in a storage battery.

A tiltable weight assembly 36 is provided which normally rests upon shoulder 18 in body member 14, but which tips laterally relative to the housing assembly 12 whenever the axis of plug 10 is tilted beyond a predetermined angle from vertical. The weight assembly 36 consists of a weight element 38 and a fulcrum element 40. Weight element 38, which is preferably a body of revolution having a trapesoidal cross-section as shown, is formed from a dense, electrolytic resistant material, such as lead. Weight element 38 is secured to a fulcrum element 40 so that whenever the axis of the plug 10 is tilted to a degree that the center of gravity of the weight assembly 36 is beyond the resulting lowest point of fulcrum element 40, the entire weight assembly 38 tilts about this low point or fulcrum point until the sidewalls of the weight assembly 36 rest against the interior sidewalls of the upper interior portion 20 of body member 14.

A cavity 42, whose function is described below, is provided in the bottom surface of the weight assembly 36. Fulcrum element 40 is essentially a washer-shaped element having on its upper surface a cylindrical portion 44 which projects upwardly into cavity 42 to form the sidewalls of the cavity. The interior surface of the washer-shaped fulcrum element 40 forms an inwardly projecting lip member 46 which separates the cavity 42 from the lower interior portion 22 of body member 14, and which defines a second axial opening 48 between cavity 42 and lower interior portion 22. Fulcrum element 40 further includes a plurality of radial communicating passages 50 to provide communication between the lower interior portion 22 and upper interior portion 20 of body member 14. In the preferred embodiment, three such passages 50 are provided which are equally angularly spaced about fulcrum element 40.

The weight element 38 may be secured to the fulcrum element 40 in any desired manner. One preferred way is to provide a plurality of countersunk holes 52 extending through the bottom surface of fulcrum element 40 and to force the lead weight element 36 downward until the lead material cold-flows into the counter-sunk hole 52 to provide the desired fastening. In practice, it has been found satisfactory to provide three such countersunk holes in fulcrum element 40 each of which is positioned diametrically opposite a respective one of the passages 50.

A valve stem member 54 is provided which has a head portion 56 and a stem portion 58. The head portion 56 is positioned in cavity 42. As is shown in the drawing, the outer diameter of the head portion 56 is greater than the diameter of second axial opening 48. Thus, head portion 56 is retained in cavity 42.

Head portion 56 of valve stem member 54 includes a lower support surface 59 which, when plug 10 is in a vertical position as shown in the drawing, rests upon the lip member 46. In accordance with one of the primary features of the present invention, this support surface 59 is substantially a frusto-conical surface. In this context, the term "frusto-conical" is intended to include not only a pure conical section, but also a support surface which might be, for any reason, curved slightly upwardly or slightly downwardly. For purposes of the present invention, it is only necessary that the radius of curvature of the lip member 46 at its point of contact with the support surface 59 is substantially smaller than the radius of curvature of support surface 58 at these points of contact. Thus, if the lower support surface 59 is a true frusto-conical surface, its radius of curvature is indefinite, and the points of contact between lower support surface 59 and lip member 48 define a circle, and not a surface. As is described in more detail below in connection with the description of the operation of plug 10, it is important that the contact between lower support surface 59 and lip member 46 be as small as possible.

In accordance with another feature of the present invention, the stem portion 58 of valve stem member 54 also includes a portion 60 of enlarged diameter which is positioned in the lower interior portion 22 of housing assembly 14. Preferably, the diameter of portion 60 is the same as that of second axial opening 48, whereby, during assembly, it also serves as a gauge to assure that the diameter of the opening 48 is correct and that the surface of lip member 46 is clean. An outwardly curved deflecting surface 62 is also provided which, as is described in more detail below, functions to prevent any solid particles which might be discharged by the battery from entering the cavity 42.

The structure of plug 10 is completed by a sealing washer 64 which is positioned coaxially around the lower part of stem portion 58 of valve stem member 54. Sealing washer 64 is retained in this position by an enlarged retaining portion 66 at the bottom of valve stem member 54 whose diameter is greater than the diameter of the axial opening in sealing washer 64. Sealing washer 64 includes a primary sealing portion 68 whose outside diameter is greater than the diameter of the first axial opening 26 in the bottom surface 24 of body member 14. As is described in detail below, the top surface of primary sealing portion 68 seals against the bottom surface 24 whenever the plug 10 is tilted. Sealing washer 64 also includes a neck portion 70 positioned as shown in the first axial opening 26 whose outside diameter is less than the diameter of first axial opening 26.

In the preferred embodiment of the invention, the housing assembly 12 consists of the body member 14 and the cap member 16, the fulcrum element 40 and the valve stem member 54 are all formed from the same electrolytic resistant material, such as polypropylene. By forming all of these items from the same material, it has been found that the likelihood of any of these surfaces freezing together at low temperatures is reduced. The sealing washer 64 is formed from a substantially softer electrolytic resistant material such as butyl rubber. The weight member 36 is, as was noted above, formed from lead.

When the plug 10 is in its normal, or vertical position as shown in the drawing, any gases evolved in the battery cell pass freely through plug 10 and are vented to the atmosphere. The path of travel for such gases is through the first axial opening 26, into the lower interior portion 22 of housing assembly 14, through the passages 50 in fulcrum element 40 into the upper interior portion 20 of housing assembly 12 and then out of the hole 72 in cap member 16 to the atmosphere. This path may be termed the low pressure relief path. However, if the gases evolved inside the battery cell build up to too high a pressure, this pressure exerted on the bottom of sealing washer 64 will cause sealing washer 64 to be lifted upward relative to valve stem member 54 until the primary sealing portion 68 of sealing washer 64 contacts and seals against the bottom surface 24 of body member 14. At this time, what may be termed a high pressure relief path still exists through plug 10 as long as plug 10 is in its vertical position. This high pressure relief path is now through the third axial opening 74 in sealing washer 64, into lower interior portion 22 of housing assembly 14, and then through passage ways 50 into the upper interior portion 20 of housing assembly 12 and out the hole 72 to atmosphere. Thus, the plug 10 provides both a high pressure and low pressure relief valve function.

If the axis of plug 10 is tilted away from vertical, the weight assembly 64 tilts relative to housing assembly 14, and valve stem member 54 is lifted upward relative to housing assembly 14 by the force exerted through lip member 46 against lower sealing surface 58. When this occurs, the upward movement of valve stem member 54 relative to housing assembly 14 causes sealing washer 64 to be lifted until primary sealing portion 68 contacts the bottom surface 24 of body member 14, thereby sealing and closing the above described low pressure relief path. At the same time, the enlarged lower portion 66 of valve stem member 54 is sealing the third axial opening 74 in sealing washer 64, thereby closing the above described high pressure relief path. Thus, the plug 10 now completely seals the battery cell in which it is employed to prevent the leakage of electrolyte out of the battery cell if the battery is held in this tipped or inverted position.

When the battery is returned to its vertical or normal position, the weight assembly 36 tilts back relative to housing assembly 12 to the position shown in the drawing. Valve stem member 54 is moved downward by the combined action of gravity and by the weight assembly 36 "knocking" on its top surface to allow sealing washer 64 to fall to the position shown in the drawing, at which time the above described gas venting path again exists through plug 10. When this occurs and the plug 10 first opens, there is frequently an initial outrushing of evolved gas from the battery cell which can carry solid particle matters, such as small particles of lead, out through the above described low-pressure venting path. Such a flow of gases, and also any solid particles carried by the gases, is deflected outwardly by the deflecting surface 62 to keep these solid particles from getting into cavity 42 or between the lip member 46 and lower sealing surface 59 of valve stem member 54. Thus, the above described undesirable build-up of such materials, which might lead to undesired lifting of valve stem member 54 is prevented. However, in accordance with another feature of the present invention, even if any such particles do manage to pass through the second axial opening 48 into cavity 42, they tend to eventually settle on the horizontal surface 76, which thus forms a reservoir for such particles, rather than fouling the actual contact point between lip member 46 and lower support surface 59.

Finally, it is noted that if the plug 10 is sealing for any reason, and if the pressure of gases within the cell becomes too high, these pressures will cause force on the bottom of the lower enlarged portion 66 of valve stem member 54 to drive this member upwardly completely through the third axial opening 74 in sealing washer 64. When this occurs, this excess pressure will effectively blast the weight assembly 36 out against cap member 16 of housing assembly 12. As was described above, cap member 16 is secured to the body member 14 in a frangible manner, and when this occurs, cap member 16 is forced off and the plug 10 is effectively popped open to provide the necessary venting function to keep the battery cell from exploding.

The pressure at which the plug 10 so pops open is a function of the softness or pliability of the material from which sealing washer 64 is formed and of the difference between the inside diameter of third axial opening 74 and the outside diameter of enlarged end portion 66 of valve stem member 54. These parameters can easily be determined empirically by those skilled in the art to provide the "pop-open" function at any desired pressure. For lower pressure, the material from which sealing washer 64 is formed should be softer or more pliable and the diameter of the axial opening 74 should be larger relative to the diameter of lower end portion 66. Conversely, for a higher "pop-open" pressure, the material should be harder and the diameter of lower end portion 66 should be greater.

While the invention is thus disclosed and the presently preferred embodiment described in detail, it is not intended that the invention be limited to this shown embodiment. Instead, many modifications will occur to those skilled in the art which lie within the spirit and scope of the invention. It is accordingly intended that the invention be limited in scope only by the appended claims.

What is claimed is:

1. A nonspill battery vent plug, comprising, in combination:
    a housing assembly including a body member in which said body member comprises a tubular side wall having an inwardly projecting shoulder member defining an upper interior portion and a lower interior portion and a bottom surface having a first axial opening therein;

a weight member positioned in said upper interior portion of said housing assembly and resting freely on said shoulder member, said weight member being adapted to tilt relative to said housing assembly whenever the axis of the plug is tilted beyond a predetermined angle from vertical, said weight member including a cavity in its bottom surface and an inwardly projecting lip member separating said cavity from said lower interior portion of said housing assembly and defining a second axial opening between said cavity and said lower interior portion of said housing assembly;

a valve stem member having a head portion and a stem portion, said head portion being positioned in said cavity, having an outer diameter greater than the diameter of said second axial opening and having a lower support surface which rests on said lip member, said lower support surface being substantially a frusto-conical surface having a radius of curvature at its points of contact with said lip member which is substantially greater than the radius of curvature of said lip member, said stem portion extending axially through said second axial opening into said lower interior portion of said housing assembly and through said axial opening, whereby said valve stem member is lifted upward relative to said housing assembly by said weight member whenever said weight member tilts relative to said housing assembly; and sealing means responsive to upward movement of said valve stem member relative to said housing assembly to close said first axial opening whenever said weight member tilts relative to said housing assembly.

2. The invention of claim 1 which further comprises deflection means for deflecting away from said second axial opening any stream of gases and solid particles carried by such gases which enter said first axial opening.

3. The invention of claim 2 in which said deflection means comprises an enlarged diameter portion of said valve stem member which includes an outwardly curved deflecting surface.

4. The invention of claim 3 in which said sealing means comprises a sealing washer including a primary sealing portion having an outside diameter greater than the diameter of said first axial opening, a neck portion having a diameter smaller than the diameter of said first axial opening and a third axial opening whose diameter is greater than the diameter of said stem portion of said valve stem member, with said sealing washer being positioned co-axially with said stem portion of said valve core member with said neck portion positioned in said first axial opening, said primary sealing portion positioned beneath the bottom surface of said housing assembly and said valve stem member including a retaining portion at its bottom end whose diameter is greater than the diameter of said third axial opening to retain said sealing washer in said co-axial position.

5. The invention of claim 4 in which said weight member comprises an assembly of a weight element and a fulcrum element secured to the bottom of said weight element, said fulcrum element including a washer-shaped portion whose inner surface is said lip member and whose central opening is said second axial opening, said fulcrum having a plurality of channels therein to provide communicating passages between the lower interior portion and the upper interior portion of said housing assembly.

6. The invention of claim 5 in which said fulcrum element further includes a cylindrical portion which forms the side walls of said cavity and in which said housing assembly and said fulcrum element are formed from the same electrolytic material.

7. The invention of claim 4 in which said housing assembly further comprises a cap member which is frangibly secured across the top end of said body member.

8. The invention of claim 7 which further comprises means responsive to pressure in excess of a predetermined maximum pressure to force said retaining portion of said valve stem member through said third axial opening to allow said weight member to rise in response to excess pressure to force said cap member from the top end of said body member, thereby venting any excess pressure to the atmosphere.

9. The invention of claim 8 in which said weight member comprises an assembly of a weight element and a fulcrum element secured to the bottom of said weight element, said fulcrum element including a washer-shaped portion whose inner surface is said lip member and whose central opening is said second axial opening, said fulcrum having a plurality of channels therein to provide communicating passages between the lower interior portion and the upper interior portion of said housing assembly, said fulcrum element further including a cylindrical portion which forms the side walls of said cavity, said fulcrum element and said housing assembly both being formed from the same electrolytic resistant material.

* * * * *